June 28, 1960  H. M. BUCK  2,942,462
DEVICE FOR MEASUREMENT OF PRESSURE OR TEMPERATURE IN WELLS
Filed June 5, 1957
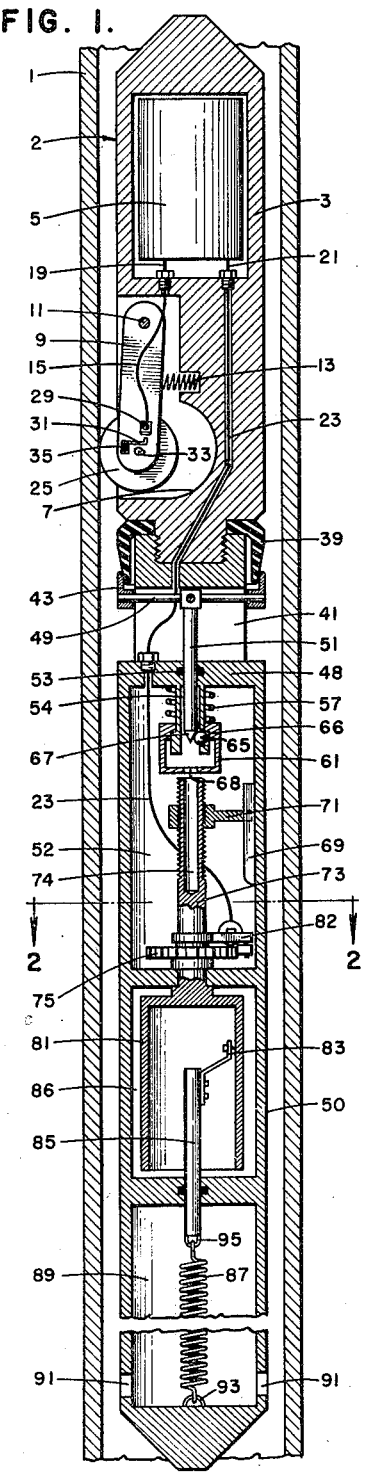
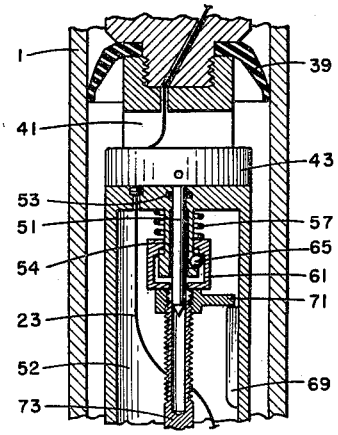
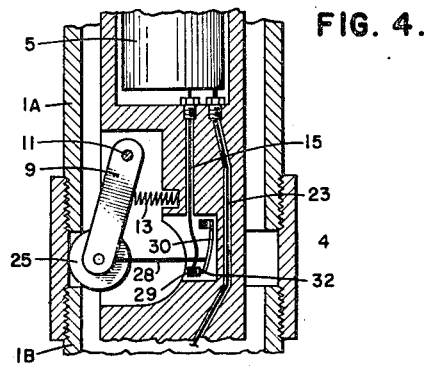
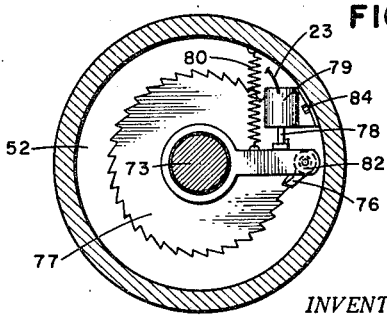
INVENTOR.
Henry M. Buck,
BY John B. Davidson
ATTORNEY.

United States Patent Office 2,942,462
Patented June 28, 1960

2,942,462
DEVICE FOR MEASUREMENT OF PRESSURE OR TEMPERATURE IN WELLS

Henry M. Buck, Harris County, Tex., assignor, by mesne assignments, to Jersey Production Research Company, Tulsa, Okla., a corporation of Delaware Filed June 5, 1957, Ser. No. 663,691

6 Claims. (Cl. 73—152)

This invention relates to apparatus for logging a physical characteristic of a fluid medium within a tubular enclosure and more particularly to means for logging the pressure or temperature gradient of a borehole or of a producing oil well.

In connection with the drilling of boreholes in the earth and with the production of petroleum deposits therefrom, it is often desirable to obtain a log of the temperature or pressure gradient within the borehole or tubing. In the past this has been accomplished by lowering a sonde containing suitable measuring apparatus within the drill pipe or tubing by means of a cable or wire line. While this procedure gives very satisfactory results, there are many instances when suitable apparatus for lowering a wire line into the earth are not available or where the locale is not suitable for the use of hoisting apparatus. For example, at offshore installations it is obviously very difficult to obtain a sufficiently stable platform for obtaining accurate measurements and even where the sea is sufficiently calm to utilize such apparatus, the obtaining of the log would be far a more costly operation than could be warranted by the results obtainable therefrom.

Accordingly, one object of this invention is to provide apparatus for logging the pressure or temperature gradient of a producing well in the earth.

Another object is to provide improved means for logging the pressure or temperature gradient of a producing well at offshore locations.

Another object is to provide improved means for logging a fluid characteristic at locations where it is inconvenient or undesirable to lower a measuring device into the well on the end of a wire line.

Still another object is to provide a means for logging a fluid characteristic in a producing well wherein operations must be conducted from the surface of a body of water.

Other objects and features will become apparent upon consideration of the following descritpion thereof when taken in connection with the accompanying drawings; wherein:

Fig. 1 is an elevational view partially in cross-section of a preferred embodiment of the invention;

Fig. 2 is a cross-sectional view taken along the line 2—2 of Fig. 1;

Fig. 3 is a view of a portion of the apparatus shown in Fig. 1 wherein certain of the parts are in an actuated position; and Fig. 4 is a cross-sectional view illustrating another embodiment of my invention.

In accordance with the teachings of the invention, the measuring and recording apparatus for the fluid characteristic to be measured and recorded is enclosed and supported by a suitable housing which additionally supports a member having a flexible annular flange, with outer diameter sufficient to substantially prevent the passage of fluid past housing through the space between the housing and the pipe of tubing to be traversed thereby. When the instrument is to be inserted into the tubing, the flexible annular flange is restrained or folded against the side of the housing by a retaining ring which is latched by a trippable latching mechanism. The latching mechanism is tripped by a mechanism responsive to transversal of the instrument through a given section of the tubing so that the flexible annular flange will snap out, substantially blocking the passage of fluid past the instrument so that the instrument will be propelled back towards the end of the tubing where it was originally inserted by fluid pressure from the opposite end of the tubing.

Further, in accordance with the teachings of the invention, the tripping device is rotated with a drum on which the fluid characteristic is recorded on a common shaft, the rotation of the shaft being proportional to the distance transversed by the instrument as the instrument passes through the tubing.

More specifically and with reference to Fig. 1, there is shown a tubing 1 which may be the tubing of a producing oil well or the drill pipe of drilling apparatus utilized in conjunction with drilling operations. An instrument housing 2 comprising an upper section 3, a middle section 41 and a lower section 50 connected together end to end in the order named, is provided for the purpose of housing the various instruments and apparatus to be described. The instrument housing preferably is generally cylindrical in form and should have a maximum outer diameter substantially less than the inner diameter of the pipe or tubing through which it is to pass. The lower section 50 comprises three subsections 52, 86, and 89. The lower sub-section 89 and the middle sub-section 86, respectively, enclose the measuring and recording apparatus for the physical characteristic to be measured. As shown, a pressure measuring device, including a piston 85 extending between subsections 86 and 89, is balanced against a spring 87 which is secured to a ring 93 in one end of the housing and an eye 95 in the lower end of piston 85. Fluids from the interior of the tubing are admitted to section 89 through ports 91. The distance that piston 85 projects into housing section 86 is proportional to the magnitude of the pressure differential between housing sections 89 and 86. Manifestly, other types of measuring devices can be used, the device disclosed being for illustrative purposes only.

A stylus 83 attached to the end of piston 85 opposite the eye 95 is provided for the purpose of recording pressure magnitude on the interior of recording drum 81, which drum is entirely enclosed by sub-section 86. Recording drum 81 is rotated and supported by a shaft 73 which extends into housing section 52. The upper end of shaft 73 is threaded for purposes to be described.

As shown more perspicuously in Fig. 2, shaft 73 is driven by and supports a ratchet gear 77. Rotation of the ratchet gear is effected by apparatus including a ratchet dog 76, supported by arm 82 which is adapted to rotate about shaft 73, and a tension spring 80 which tends to bias arm 82 for counterclockwise rotation as viewed in Fig. 2. A solenoid 79 is connected to arm 82 by an extension 78 of the solenoid armature so as to restrict counterclockwise movement of the arm 82 under the influence of spring 80 and to rotate arm 82 clockwise when the actuating coil of the solenoid 79 is energized. Solenoid 79 is connected to the outer wall of the section 52 by a flange 84 which is securely fastened to the wall.

For the purpose of periodically energizing solenoid 79 as the instrument moves through the tubing, there is provided an electric energy source 5, which may be an ordinary dry battery, one terminal 21 of which is connected to the actuating coil of the solenoid through an electric conductor 23. Battery 5 is housed in an enclosure within the upper section 3 of the instrument housing 2.

Also included within the housing 2 for the purpose of completing the electric circuit for energizing solenoid 79 is an electric switch having a movable switch arm 31 connected to the instrument casing by lug 35 and electrically connected through the instrument casing to the solenoid 79. The switch also has a stationary contact 29 which is electrically connected to the other terminal 19 of the battery 5 through electrical conductor 15.

A cam 33 is provided for the purpose of momentarily biasing switch arm 31 into electric contact with electrical contact member 29 upon every revolution of roller member or wheel 25. Wheel 25 is supported by arm 9 and is biased into contact with the interior of tubing 1 by compression spring 13. Arm 9 pivots about pivot point 11, as shown. The wheel 25 is adapted for movement into a recess 7 within upper section 3 of the instrument housing.

Clamped between the upper section 3 and middle section 41 of the instrument housing so as to be affixed to and encircle a portion of the housing is a member having a flexible flange 39, the outer diameter of which should be at least equal to the inner diameter of tubing 1 in order to most effectively prevent passage of fluid between tubing 1 and the instrument casing when the flange is in its normal, unrestrained position. The flange should be fairly stiff so as to propel the instrument through the tubing under the impetus of fluid pressure when it is in its normal, unrestrained shape. The flexible member may most conveniently be a cup washer as is shown in Fig. 1. Sections 3 and 41 of the instrument housing screw threadedly engage each other so that the flexible member 39 may be readily positioned therebetween and will be rigidly secured thereto when the two members are screwed together. The cup washer conveniently may be made of neoprene or other oil resistant material and, as mentioned above, must normally assume a shape that will effectively prevent passage of fluid past the instrument. When unrestricted, its outer edge should engage the interior of tubing 1.

It should be noted that electric conductor 23 passes through a channel or bore drilled within upper section 3 of the instrument housing, through a portion of the middle section 41 and through the wall 48. While the electric circuit is shown as being completed from lug 35 to solenoid 79 through the casing of the instrument, manifestly an electrical connection having lower resistance can be secured by electrically wiring the two points together and, if desired, such means may be used.

For the purpose of permitting free movement of the instrument through the tubing, it is necessary to fold or restrain flexible member 39 against the side of the instrument so that fluids may flow past the instrument. For this purpose an annular retaining ring 43 is provided which is latched in the position shown in Fig. 1 by apparatus described below. The retaining ring is supported by one or more cross-arms 49 secured to a central rod 51 which extends downwardly through the wall 48, preferably on the longitudinal axis thereof. A passageway for the rod 51 is provided by a bore drilled through the upper wall 48 of instrument casing section 52 and through a downwardly extending member 54 which encloses the pointed end 67 of the rod 51. Downwardly extending member 54 holds a sphere or ball 65 in engagement with the pointed end 67 and thus supports the rod 51 and cross-arm 49. Enclosing the downwardly extending member 54 is a cage 61 which is normally biased in a downward direction by spring 57. The end of rod 51 and the cage 61 are arranged in the upper end of the chamber defined by upper sub-section 52. Sealing means 53 is provided to afford a fluid-tight seal between the exterior of the housing and the chamber.

As mentioned above, the upper end of shaft 73 is screw threaded. A tripping member 71 is provided which screw threadedly engages the screw threaded section of shaft 73 and which is restrained against rotation by a groove within a member 69 fastened to the side of the instrument housing. As solenoid 79 is repetitively energized, ratchet gear 77 will rotate shaft 73, and the tripping member 71 will move upwardly. Tripping member 71 in time will force cage 61 upwardly against the restraining influence of spring 57 so that sphere or ball 65 will move outwardly as shoulder 66 which formerly restrained outward movement of ball 65, is moved upwardly. Thus the pointed end 67 of rod 51 is no longer in engagement with sphere 65 so that the retaining ring 43 falls out of engagement with flexible annular member 39. Annular member 39 snaps out to prevent fluid from passing around the instrument. It will be noted that shaft 73 has a central bore 74 in line with rod 51, and that cage 61 has a central hole 68 through which rod 51 may project. When rod 51 is no longer supported by ball 65, it will fall through hole 68 into bore 74 until retaining ring 43 strikes the upper end of housing section 52.

To reset the ball 65 after annular member 39 has been released and the device returned to the surface of the earth, a sealable access port (not shown) may be provided in casing section 52. Alternatively, the housing may be made into sections by breaking the casing above guide member 69. The sections may be threaded together for easy assembly and disassembly.

In operation, when it is desired to run a temperature or pressure log, all that is necessary for the operator to do is to latch the annular flexible member 39 and to drop the instrument into the well. As the flexible member or cup washer 39 is restrained by retaining ring 43, the instrument can move freely downward in spite of upward fluid flow of substantial magnitude. As the instrument moves downwardly, wheel 25 will engage the side of the tubing 1 and will rotate. Successive closures of the electric switch by cam 33 will repetitively energize solenoid 79 thus rotating ratchet gear 77 and shaft 73. Rotation of shaft 73 will in turn rotate recording drum 81 and the pressure variations as the instrument moves downwardly into the well will be recorded. In due course, tripping device 71 will engage cage 61 to release flexible annular member 39 to prevent further downward movement of the instrument. Fluid flow upwardly through the well will propel the instrument upwardly to the well head where it readily may be recovered.

It will be noted that wheel 25 will be in rolling contact with the side of tubing 1 both when the instrument is moving downwardly into the well and upwardly out of the well. Thus a recording of temperature or pressure variations will be made for both directions of movement. To locate the lowest point at which the instrument penetrates the well, it is only necessary to note the midpoint of the record produced thereby.

Fig. 4 illustrates a modification of the apparatus described above, for the purpose of utilizing pipe joints to close the electrical contacts that complete the electrical circuit for energizing solenoid 79. Pivot arm 9 is connected to a conductive spring member 30 by a connecting rod or a flexible cord 28 to draw contact 32 into engagement with contact 29. When roller 25 reaches a joint, such as that formed by tubing sections 1A and 1B and connecting collar 4, spring 13 will bias arm 9 outwardly so that roller member 25 will momentarily slip into the groove formed by the tubing sections and collar 4 to bring contacts 29 and 32 into engagement. Spring member 30 may be made of Phosphor bronze, and is securely affixed to the instrument casing so as to be in electrical contact therewith. Spring member 30 normally holds contact 32 away from contact 29. In all other respects, this embodiment of the invention is the same as that described with respect to Figs. 1, 2, and 3.

Manifestly, the objects set forth above are achieved by the invention as described. The apparatus will function satisfactorily without the necessity of use of wire line, hoisting apparatus, or like contrivances. The location at which the instrument is to be used is of no importance insofar as securing of results is concerned; its use is feasible regardless of whether the location is ashore or offshore.

Although the embodiment dislosed in the preceding specification is preferred, other modification will be apparent to those skilled in the art which do not depart from the broadest aspects of the scope of the invention.

What is claimed is:

1. In combination: apparatus for measuring a characteristic of a fluid medium within a pipe string through which earth fluids are withdrawn from the earth; a housing for said fluid characteristic measuring apparatus; annular means, including a flexible annular flange, affixed to and encircling said housing; said flexible annular flange having an outer diameter at least equal to the inner diameter of the pipe string to move said housing in the direction of fluid flow through the pipe string by preventing fluid flow past said housing; flange retaining means having a latched position and an unlatched position, said flange retaining means when in said latched position being adapted to hold said flexible annular flange in a folded position to permit free downward movement of said housing through the pipe string; trippable latch means for holding said flange retaining means in the latched position thereof; tripping means for said latch means having a threaded bore and being adapted to move in a direction to trip said latch means; a rotatable threaded shaft in threaded engagement with said bore; and means, including means in engagement with the pipe string, for rotating said threaded shaft in a given angular direction responsive to said free downward movement of said housing through the pipe string to cause said latch means to trip after a predetermined downward movement of said housing for the purpose of unlatching said flange retaining means to release said flange from its folded position.

2. In combination: apparatus for measuring a characteristic of a fluid medium within a pipe string through which earth fluids are withdrawn from the earth; a housing for said fluid characteristic measuring apparaus; annular means, including a fiexible annular flange, affixed to and encircling said housing; said flexible annular flange having an outer diameter at least equal to the inner diameter of the pipe string so as, when unrestrained, to move said housing through the pipe string by preventing fluid flow past said housing; flange retaining means having a latched position and an unlatched position, said flange retaining means, when in said latched position, being adapted to hold said flexible annular flange in a folded position to permit free downward movement of said housing through the pipe string; trippable latch means for holding said flange retaining means in the latched position thereof; tripping means for said latch means having a threaded bore, said tripping means being adapted to move in a direction to trip said latch means; a rotatable threaded shaft in threaded engagement with said bore; a ratchet wheel connected to said shaft; and means for rotating said ratchet wheel through a predetermined angle of rotation responsive to said free downward movement of said housing through the pipe string to cause said latch means to trip after a predetermined downward movement of said housing for the purpose of unlatching said flange retaining means to release said flange from its folded position.

3. In combination: apparatus for measuring a characteristic of a fluid medium within a pipe string through which earth fluids are withdrawn from the earth; a housing for said fluid characteristic measuring apparatus; annular means, including a flexible annular flange, affixed to and encircling said housing; said flexible annular flange having an outer diameter at least equal to the inner diameter of the pipe string to move said housing in the direction of fluid flow through the pipe string by preventing fluid flow past said housing; flange retaining means having a latched position and an unlatched position; said flange retaining means, when in said latched position, being adapted to hold said flexible annular flange in a folded position to permit free downward movement of said housing through the pipe string; trippable latch means for holding said flange retaining means in the latched position thereof; tripping means for said latch means having a threaded bore and being adapted to move in a direction to trip said latch means; a rotatable threaded shaft in threaded engagement with said bore; a ratchet wheel connected to said shaft; electromagnetically actuable means for rotating said ratchet wheel through a predetermined angle upon every actuation thereof; an electromagnet for actuating said electromagnetically actuable means upon energization thereof; current source means adapted to energize said electromagnet; switch means for momentarily coupling said current source means to said electromagnet with each traversal of said housing through a predetermined length of the pipe string; and means engaging the pipe string wall and connected to said switch means for repetitively actuating said switch means responsive to free downward movement of said housing through the pipe string to cause said latch means to trip after a predetermined downward movement of said housing for the purpose of unlatching said flange retaining means to release said flange from its folded position.

4. In combination: fluid characteristic measuring apparatus for measuring a characteristic of a fluid medium within a pipe string through which earth fluids are withdrawn from the eearth; a housing for said fluid characteristic measuring apparatus; annular means, including a flexible annular flange, affixed to and encircling said housing; said flexible annular flange having an outer diameter at least equal to the inner diameter of the pipe string to move said housing in the direction of fluid flow through the pipe string by preventing fluid flow past said housing; flange retaining means having a latched position and an unlatched position, said flange retaining means, when in said latched position, being adapted to hold said flexible annular flange in a folded position to permit free downward movement of said housing through the pipe string; trippable latch means for holding said flange retaining means in said latched position thereof; tripping means for said latch means having a threaded bore, said tripping means being adapted to move in a direction to trip said latch means; a rotatable threaded shaft in threaded engagement with said bore; a ratchet wheel connected to said shaft; electromagnetically actuable means for rotating said ratchet wheel to a predetermined angle; an electromagnet for actuating said electromagnetically actuable means upon energization thereof; current source means adapted to energize said electromagnet; switch means for momentarily coupling said current source means to said electromagnet upon actuation thereof; and means, including a roller means, adapted to roll along the inner surface of the pipe string for repetitively actuating said switch means responsive to said free downward movement of said housing through the pipe string to cause said latch means to trip after a predetermined downward movement of said housing for the purpose of unlatching said flange retaining means to release said flange from its folded position.

5. In combination: fluid characteristic measuring apparatus for measuring a characteristic of a fluid medium within a pipe string through which earth fluids are withdrawn from the earth; a housing for said fluid characteristic measuring apparatus; annular means, including a flexible annular flange, affixed to and encircling said housing; said flexible annular flange having an outer diameter at least equal to the inner diameter of the pipe string to move said housing in the direction of fluid flow through the pipe string by preventing fluid flow past said housing; flange retaining means having a latched position and an unlatched position, said flange retaining means being adapted to hold said flexible annular flange in a folded position to permit free downward movement of said housing through the pipe string; trippable latch means for holding said flange retaining means in the latched position thereof; tripping means for said latch means having a threaded bore, said tripping means being adapted to move in a direction to trip said latch means; a rotatable threaded shaft in threaded engagement with said bore; a ratchet wheel connected to said shaft; electromagnetically actuable means for rotating said ratchet wheel through a predetermined angle upon every actuation thereof; an electromagnet for actuating said electromagnetically actuable means upon energization thereof; current source means adapted to energize said electromagnet; switch means for momentarily coupling said current source means to said electromagnet upon movement of said housing through a predetermined length of the pipe string; recording means driven by said threaded shaft for recording output indications from said fluid characteristic measuring apparatus; and means engaging the pipe string wall and connected to said switch means for repetitively actuating said switch means responsive to free downward movement of said housing through the pipe string to cause said latch means to trip after a predetermined downward movement of said housing for the purpose of unlatching said flange retaining means to release said flange from its folded position.

6. Apparatus for measuring a characteristic of a fluid medium within a pipe string insertable within a borehole penetrating the earth, comprising: a housing; a recording drum within said housing adapted to be rotatably driven by a threaded shaft axially connected thereto; means for continuously measuring said characteristic and recording the measurement obtained thereby on said drum; a notched ratchet wheel secured to said shaft; a spring-biased pawl for engaging the notches of said ratchet wheel; means, including electromagnetic means, for successively advancing said pawl to adjacent notches on said ratchet wheel upon successive energizations of said electromagnetic means; an annular member having a flexible annular flange with an outer diameter at least equal to the inner diameter of the pipe string; said annular member being affixed to and encircling the exterior of said housing; trippable latch means for folding said flexible flange toward the side of said housing; tripping means threadedly engaging said threaded shaft so as to be moved by rotation of said threaded shaft to trip said latch means after a predetermined number of revolutions of said ratchet wheel to release said flexible flange and permit said flexible flange to contact the interior surface of the pipe string; and means engaging the pipe string wall for momentarily and repetitively energizing said electromagnetic means responsive to free downward movement of said housing through the pipe string to rotate said shaft and move said tripping means so as to trip said latch means after a predetermined downward movement of said housing for the purpose of releasing said flange.

References Cited in the file of this patent
UNITED STATES PATENTS

| | | |
|---|---|---|
| 2,265,098 | Bettis | Dec. 2, 1941 |
| 2,292,938 | Hennessy | Aug. 11, 1942 |
| 2,655,996 | Earl et al. | Oct. 20, 1953 |
| 2,674,126 | Coberly | Apr. 6, 1954 |
| 2,776,564 | Montgomery | Jan. 8, 1957 |
| 2,779,192 | Rumble et al. | Jan. 29, 1957 |